United States Patent [19]
Meschonat et al.

[11] 3,847,041
[45] Nov. 12, 1974

[54] BOLT TENSIONING AND NUT THREADING ARRANGEMENT

[75] Inventors: Gunter Meschonat; Peter Schungel, both of Dortmund, Germany

[73] Assignee: Klockner-Werke AG, Duisburg, Germany

[22] Filed: Aug. 30, 1973

[21] Appl. No.: 393,143

[52] U.S. Cl. ............................................. 81/57.38
[51] Int. Cl. .......................................... B25b 29/02
[58] Field of Search .................................. 81/57.38

[56] References Cited
UNITED STATES PATENTS
| | | | |
|---|---|---|---|
| 3,162,071 | 12/1964 | Biach | 81/57.38 |
| 3,722,332 | 3/1973 | Jones | 81/57.38 |

Primary Examiner—James L. Jones, Jr.
Attorney, Agent, or Firm—Michael S. Striker

[57] ABSTRACT

A vessel has a flange provided with an annulus of projecting threaded bolts, and onto each of these bolts a nut is threaded which is provided on its outer periphery with an annulus of teeth and with an annular groove. A drive pinion is engageable with the teeth for rotating the respective nut so as to bring it into and out of mesh with the associated bolt and a detent is engageable in the respective groove for holding the nut when the same moves towards out-of-mesh position. A tensioning arrangement axially tensions the bolts and a lifting arrangement is provided for lifting the tensioning arrangement away from the bolt and the flange.

8 Claims, 5 Drawing Figures

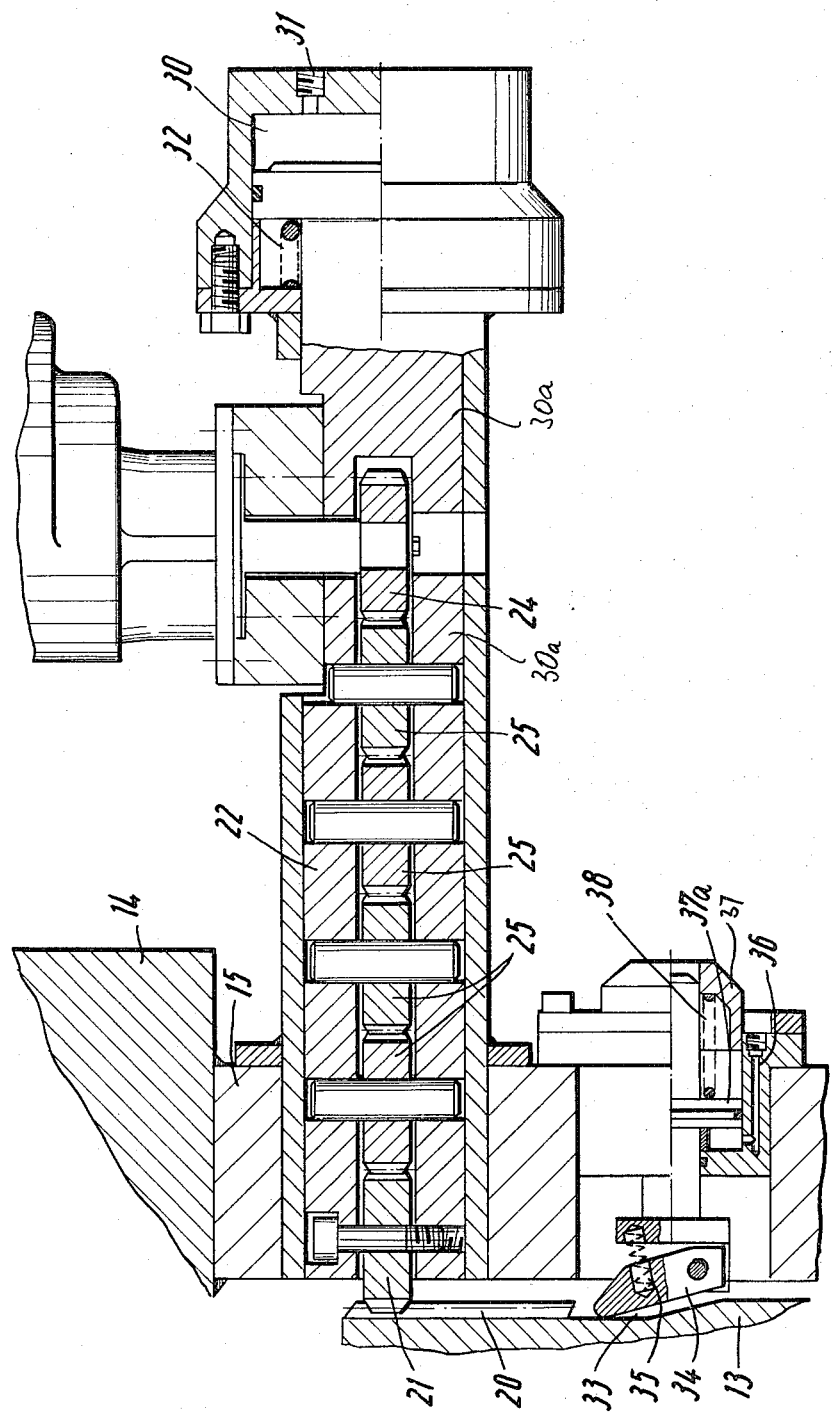

BOLT TENSIONING AND NUT THREADING ARRANGEMENT

BACKGROUND OF THE INVENTION

The present invention relates generally to a bolt tensioning and nut threading arrangement, and more particularly to an arrangement for tensioning bolts which are arranged in an annulus, and for threading nuts onto and off these bolts.

There are instances for example in the case of reactor vessels or the like, where covers or the like are held by means of nuts threaded onto bolts which are arranged in an annulus and carried by a flange of the vessel. To permit these nuts to be threaded onto or off the bolts it is necessary that the latter first be subjected to axial tensioning, for which purpose the prior art uses a hydraulic cylinder which acts directly upon a two-part tensioning nut which can be connected with the outer free end of the bolt which is to be subjected to axial tensioning. When this tensioning or stressing is carried out the nut which may have a weight of up to approximately 80 kg is manually threaded onto or off the bolt. This requires the labor of two workers who must jointly turn the nut for a period of approximately 15 minutes before it is fully threaded onto or off the bolt. In many instances, this period of time is excessively long in terms of possible damage to the health of the workers, for instance if a reactor vessel is involved and where the workers may be subjected to the influence of more or less intensive radioactivity. Under these circumstances it is evidently not tolerable that the workers be exposed for so long a period of time to the radioactivity, because of the health hazards which are involved.

Heretofore, it has been attempted to overcome the problem by having at least two groups of workers standing by, and in many instances, to have even three groups of workers standing by, each group for instance being composed of two workers. It is the common practice that one group of workers threads or unthreads the nut for the period of time which is permissible without causing damage to the health of the workers, and is then replaced by the next group which can again work for the permissible period of time. This is hardly either a safe or an economical way of carrying out the aforementioned operation.

SUMMARY OF THE INVENTION

It is, accordingly, an object of the present invention to overcome the disadvantages of the prior art.

More particularly, it is an object of the present invention to provide an improved arrangement which permits axial tensioning of the bolts and threading of the nuts onto and off the bolts without requiring the physical proximity of any workers, so as to eliminate the hazard to the health of the workers and to make the required operations more economical.

In keeping with the above objects, and others which will become apparent hereafter, one feature of the invention resides in an arrangement of the character herein described which, briefly stated, comprises a vessel having a flange provided with an annulus of projecting threaded bolts. A nut is threaded onto each of the bolts and has an outer periphery provided with an annulus of teeth and with an annular groove. Drive means is engageable with these teeth for rotating the respective nut so as to bring it into and out of mesh with the associated bolt. Detent means is engageable in the respective groove for holding the associated nut when the same moves towards out-of-mesh position. Tensioning means is provided for axially tensioning the bolts, and lifting means for lifting the tensioning means away from the bolts and the flange.

By resorting to the present invention, all operations can be carried out without requiring the presence or manual of any workers, so that any health hazards to the workers is eliminated.

In addition, the elimination of any manual labor, of course results in greater economy of the operations involved.

Each of the nuts may be provided with its own drive unit having a pinion which is engageable with the teeth of the nut, and which can be moved into and out of such engagement by a fluid-operated cylinder and piston unit. This construction assures that an engagement of the pinion with the teeth of the associated nut will take place only as the nut is being threaded onto or off the bolt, and that at all other times, the pinion is out of engagement with the teeth of the nut.

It is advantageous if the drive means, whether it be individual drive means for each nut or not, uses rotary field magnets because the latter can be maintained against their full torque for a prolonged period of time without being subjected to damage. This is necessary because these drives are capable of turning the nuts faster than the spindles provided as part of the lifting means can lift the support ring on which the tensioning means is mounted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 5 is a partly sectioned detail view on an enlarged scale, showing the detail X of FIGS. 1 and 4 which Figures correspond to one another insofar as this detail is concerned.

DESCRIPTION OF THE PREFERRED EMBODIMENT

Figure 1:
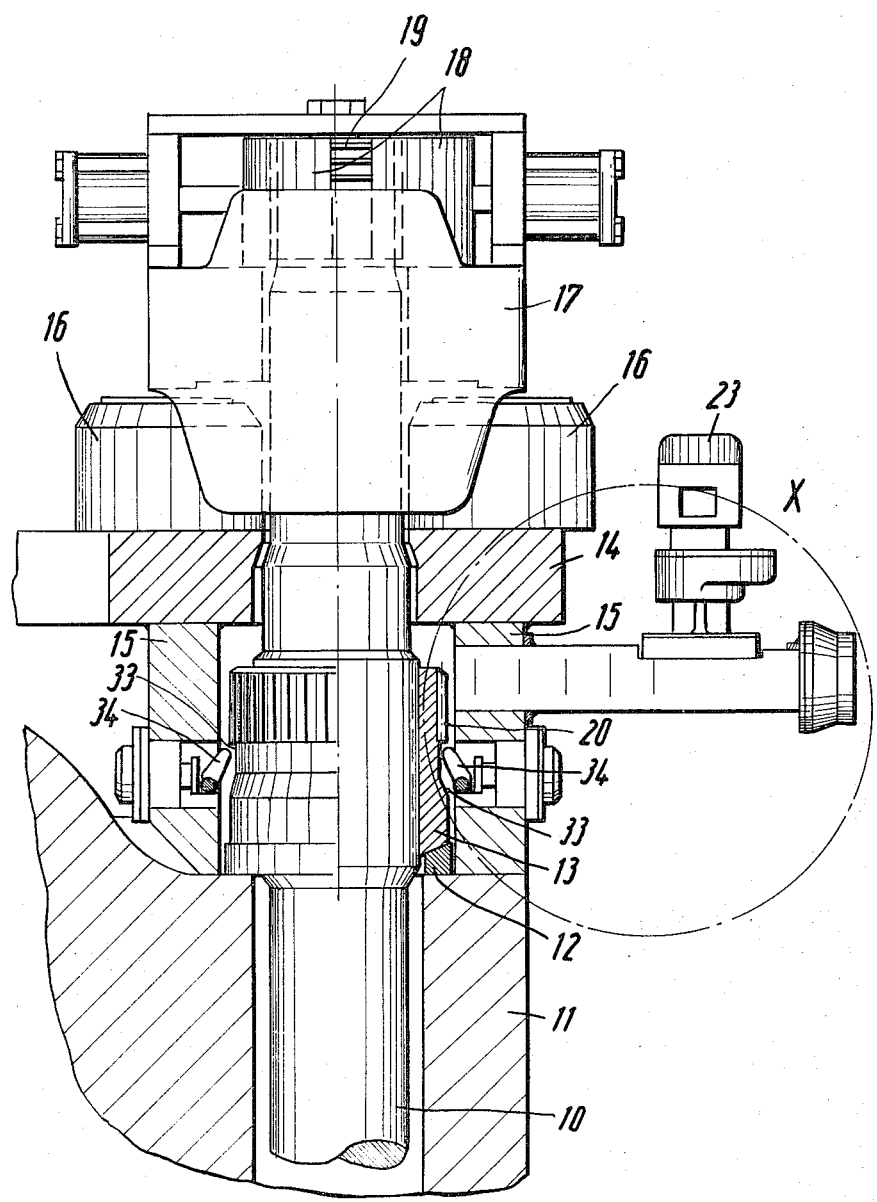
FIG. 1 is a fragmentary section taken on line I—I of FIG. 2.
Figure 2:
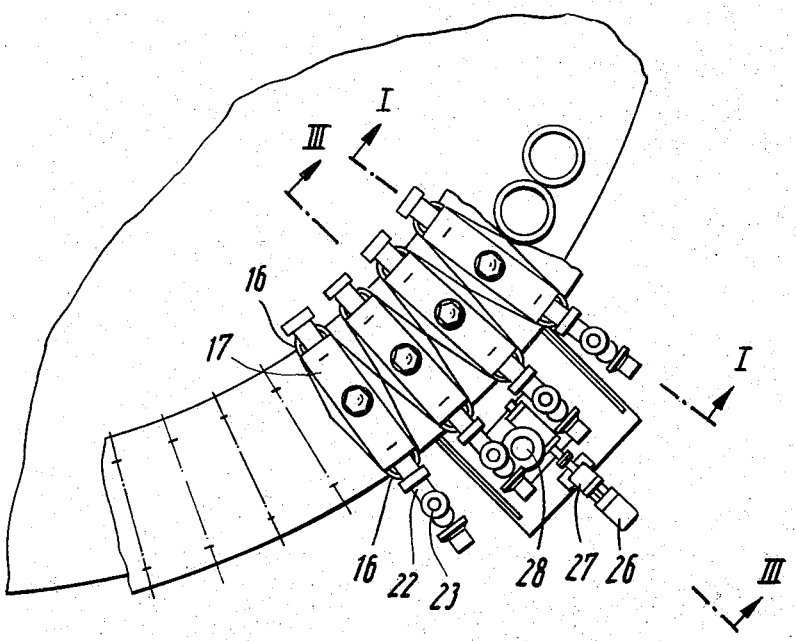
FIG. 2 is a fragmentary top-plan view of an arrangement according to the present invention.

The two illustrated embodiments shown in the drawing are for the purpose of axially tensioning bolts, and for threading nuts onto and off the bolts. Such an arrangement is particularly used in conjunction with a reactor or similar vessel having a flange 11 (the only part of the reactor vessel that is shown) which should be understood to be annular and in which a plurality of bolts 10 are anchored, with the bolts similarly forming an annulus.

Each of the bolts 10 is provided with a washer 12 onto which a nut 13 is drawn down. Located above the respective nut 13, spaced from the same, is a support ring 14 which is provided with abutment portions 15 engaging the flange 11 so as to support the ring 14 on the latter. Lifting cylinders 16 are provided on the ring 14, which act upon nuts 17 to thereby transmit force to jaws 18 which are formed with grooves or ribs which engage with a system of complementary grooves or ribs 19 formed at the upper free end of the respective bolt 10, so that the jaws 18, when actuated, can engage and hold this upper end.

As FIG. 5 shows particularly clearly, each of the nuts 13 is provided in its upper region with an annulus 20 of teeth. The output pinion 21 of a drive unit 21 meshes with the teeth 20. In the illustrated embodiment a separate drive unit is provided for each of the nuts 13 and will be seen in FIGS. 1 and 5 to utilize a rotary field magnet 23 (known from the art and therefore requiring no detailed discussion) which directly drives an input pinion 24. The rotary motion of the input pinion 24 is transmitted via intermediate pinions 25 to the output pinion 21 which is thus rotated and which in turn turns the nut 13 while it is in engagement with the teeth 20 thereof. The input pinion 24, the intermediate pinion 25, and the output pinion 21 are all journalled for turning movement in a piston 30a (which may be of one piece or of two pieces which are connected for joint movement) which in turn is slidable in a cylinder 30. A spring 32 normally urges the piston 30a towards the right in FIg. 5, but when fluid under pressure is admitted through the input 31 into the cylinder 30, the piston 30a is shifted towards the left until the teeth of the output pinion 21 are in engagement with the teeth 20 of the respectively associated nut 13. At all other times, that is when fluid is not admitted into the cylinder 30, the spring 32 assures that the pinion 31 is out of engagement with the teeth 20 of the nut 13.

An annular groove 33 is also formed in the outer circumference of the respective nut 13, and an abutment member 34 is pivotally mounted and biased by a spring 35 so as to extend into the groove 33. The member 34 is mounted on a piston 37a which is slidable towards the left (see FIG. 5) in a cylinder 37. A spring 38 normally urges the piston 37a towards the left, maintaining the abutment member 34 in engagement with the groove 33. When pressure fluid is admitted through the fluid input 36 into the cylinder 37, the spring 38 is compressed and the piston 37a retracted towards the right, whereby the abutment member 34 is withdrawn out of the groove.

Figure 3:
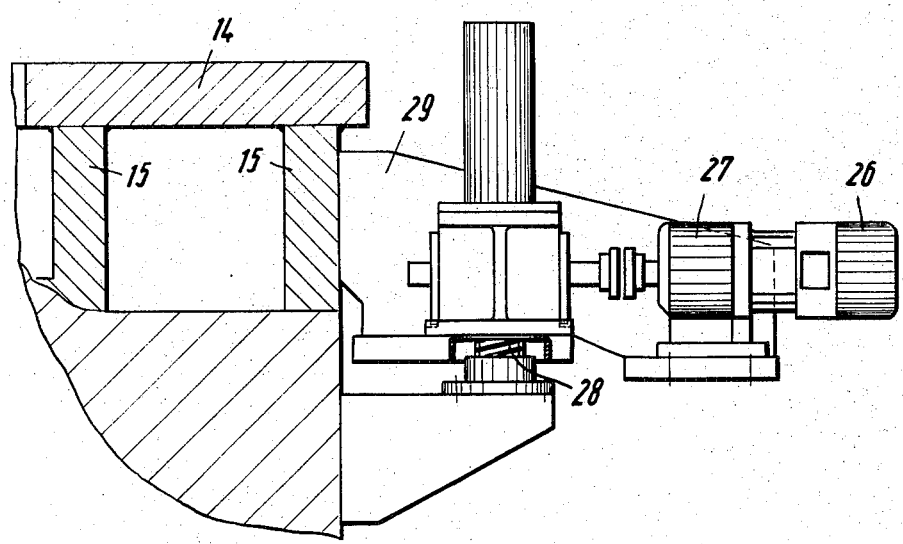
FIG. 3 is a fragmentary partly sectioned side view of the arrangement in FIGS. 1 and 2.

A lifting spindle 28 is driven via motor 26 and transmission 27 (see FIG. 3) and is mounted on support which is connected either with a base or with the cover of the vessel. An arm 29 on the spindle 28 extends beneath the support ring 14 and lifts the latter upwardly off the flange 11, when the spindle 28 is turned in requisite direction. Of course, more than one of these spindles will be provided, being distributed around the circumference of the flange 11.

When in the embodiment of FIGS. 1 – 3 and 5 the nuts 13 are to be threaded off the bolts, the entire arrangement for tensioning of the bolts 10 is first placed onto the flange 11. Thereupon the jaws 18 are made to engage with the projections or grooves 19 at the upper end of the respective bolt 10, and pressure fluid is admitted into the cylinders 16 which now shift the jaws upwardly and thereby tension the bolts 10 whose upper ends are engaged by them. Subsequently cylinder 30 is supplied with pressure fluid to make the output pinion 21 engage with the teeth 20 and the respective nut 13, and to turn the nuts 13 until they reach the lower side of the ring 14. The supply of pressure fluid to the cylinders 16 is now terminated and the jaws 18 disengage from the upper ends of the bolts 10. The abutment members 34 now engage into the groove 33 of the respective nut 13. Of course, in place of the abutment members 34 it is possible under certain circumstances to shift an appropriately configured member between two adjacent ones of the nuts 13 in such a manner that it engages in the grooves 33 of both of these nuts.

In any case after engagement of the abutment members 34 in the respective grooves 33, the spindles 18 are operated until the entire tensioning arrangement is lifted off the bolts 10 and the flange 11. As this arrangement moves upwardly together with the ring 14, of course, the nuts 13 can be further threaded upwardly along the bolts 10 until they become disengaged from the threads thereof. The upper open end of the respective bolt 10 at this time guides the respective nut 13 and prevents it from tilting and of falling off as it leaves the last turns of the threads on the bolt 10, that is as it becomes disengaged from these last turns.

The aforementioned operations are performed in reverse order when the nuts 13 are to be threaded on to the bolts 10.

The provision of the members 34 assures that the nuts 13 will be reliably lifted off the bolts 10 as the arrangement is finally raised away from the bolts.

The spindles 18 are motor-driven as already been made clear. Any desired number of them may be provided but usually three of them spaced equi-distantly about the periphery of the flange 13 are sufficient.

Figure 4:
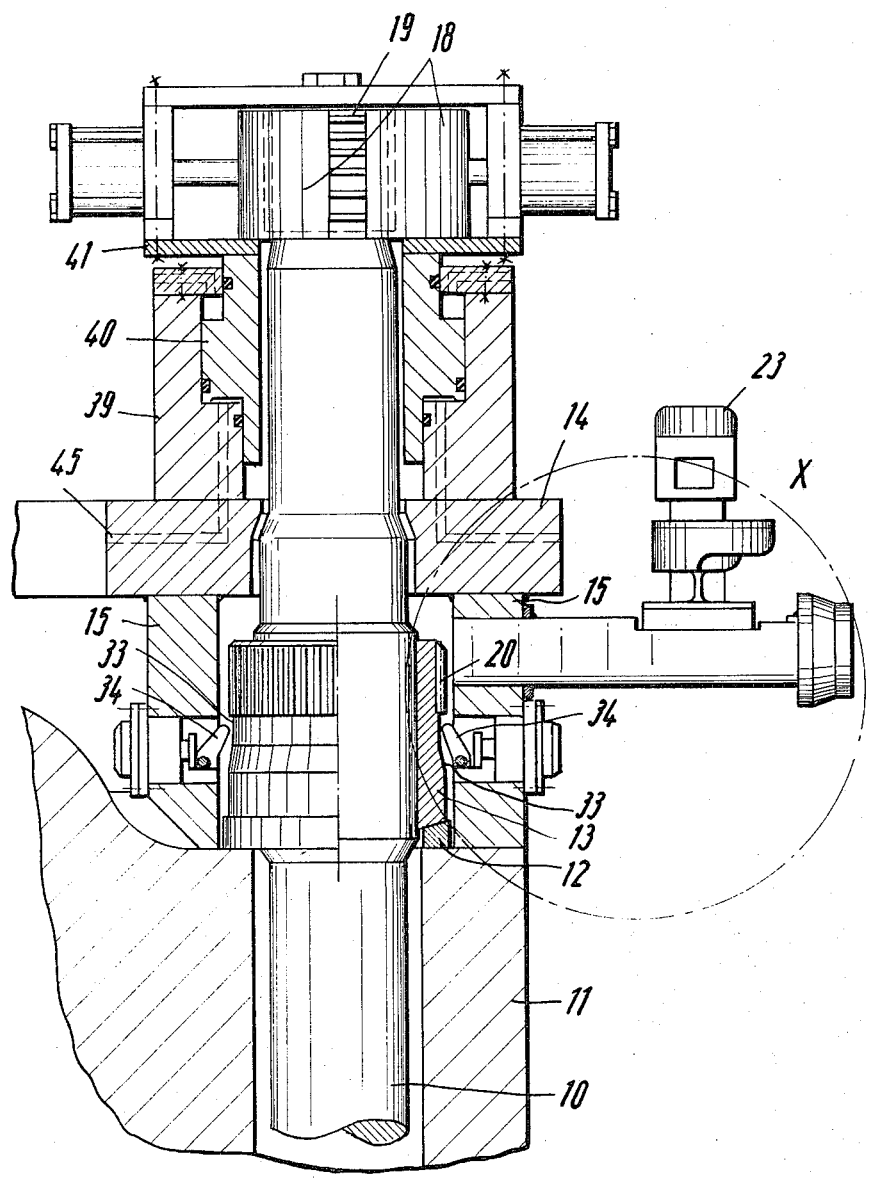
FIG. 4 is a view similar to FIG. 1 but illustrating a slightly different embodiment.

The embodiment in FIG. 4 is largely the same as that in FIGS. 1 – 3 and 5. In fact the detail shown in FIG. 5 is the same for FIG. 4, as much as it is applicable to FIGS. 1 – 3. Like reference numerals therefore identify like elements in FIG. 4.

The embodiment of FIG. 4 differs from that of FIG. 1 in that it does not use two of the cylinders 16 but instead employs for each of the bolts 10 an annular cylinder 39 which surrounds the respective bolt 10. In the clearance between the inner side of the cylinder 39 and the outer side of the associated bolt 10, there is located a piston 40, and although only one cylinder 39 and piston 40 has been illustrated, it will be appreciated that an annulus of them is provided each associated with one of the bolts 10. A plate 41 is supported by all of the pistons 40. When pressure fluid is admitted via the fluid input 45 into the respective cylinder 39, the associated piston 40 is lifted upwardly lifting the plate 41 in turn and causing the jaws 18 to be similarly lifted. When the jaws 18 are engaged with the projections or recesses 19 at the upper open end of the bolt 10, this causes the bolt to be subjected to axial tensioning.

It will be understood that each of the elements described above, or two or more together, may also find a useful application in other types of constructions differing from the types described above.

While the invention has been illustrated and described as embodied in an arrangement for tensioning bolts and threading nuts on and off the same, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an arrangement of the character described a combination comprising a vessel having a flange provided with an annulus of projecting threaded bolts; a nut threaded onto each of said bolts and having an outer periphery provided with an annulus of teeth and with an annular groove; drive means engageable with said teeth for rotating the respective nut so as to bring it into and out of mesh with the associated bolt; detent means engageable in the respective groove for holding the associated nut when the same moves towards out-of-mesh position; tensioning means for axially tensioning said bolts; and lifting means for lifting said tensioning means away from said bolts and said flange.

2. A combination as defined in claim 1, wherein said drive means comprises a plurality of individual drive units, one for each of said nuts.

3. A combination as defined in claim 2, wherein each of said drive units comprises a drive pinion engageable with said teeth of the associated nut, and a fluid-operated cylinder and piston unit for moving said drive pinion into such engagement.

4. A combination as defined in claim 1, wherein said drive means comprises pinion means engageable with said teeth, and rotary-field magnet means for turning said pinion means.

5. A combination as defined in claim 1, wherein said detent means comprises a plurality of detent units each associated with one of said nuts, each of said detent units having a detent member, spring means urging said detent member into engagement with the respectively associated groove, and fluid-operated means for retracting the detent member from the associated groove.

6. A combination as defined in claim 5; further comprising a support ring which is supported on said flange and on which said tensioning means is provided.

7. A combination as defined in claim 6; wherein said detent units are provided on said support ring.

8. A combination as defined in claim 6, wherein said lifting means comprises motor-driven spindles which engage said support ring for lifting the same away from said flange.

* * * * *